(12) United States Patent
Brown et al.

(10) Patent No.: US 12,353,589 B1
(45) Date of Patent: *Jul. 8, 2025

(54) METHOD AND APPARATUS FOR PROTECTING SENSITIVE DATA

(71) Applicant: INTRANEXT SOFTWARE, INC., Englewood, CO (US)

(72) Inventors: Patrick Brown, Parker, CO (US); James Mitch, Lone Tree, CO (US); Michael Verlare, Centennial, CO (US)

(73) Assignee: INTRANEXT SOFTWARE, INC., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,952

(22) Filed: Mar. 22, 2021

Related U.S. Application Data

(63) Continuation of application No. 15/882,388, filed on Jan. 29, 2018, now Pat. No. 10,956,605, which is a continuation of application No. 15/170,723, filed on Jun. 1, 2016, now Pat. No. 9,881,178.

(60) Provisional application No. 62/331,938, filed on May 4, 2016, provisional application No. 62/291,288, filed on Feb. 4, 2016, provisional application No. 62/221,964, filed on Sep. 22, 2015.

(51) Int. Cl.
*G06F 21/62* (2013.01)
*G06Q 20/10* (2012.01)
*H04M 3/51* (2006.01)

(52) U.S. Cl.
CPC ........ *G06F 21/6245* (2013.01); *G06Q 20/10* (2013.01); *H04M 3/5183* (2013.01); *H04M 2203/6009* (2013.01)

(58) Field of Classification Search
CPC .. G06F 21/6245; G06Q 20/10; H04M 3/5183; H04M 2203/6009
See application file for complete search history.

(56) References Cited

U.S. PATENT DOCUMENTS

| | | | |
|---|---|---|---|
| 5,790,798 A | | 8/1998 | Beckett |
| 5,870,464 A | * | 2/1999 | Brewster ................. H04M 3/51 719/317 |
| 5,953,332 A | * | 9/1999 | Miloslavsky ........... H04M 3/58 313/414 |

(Continued)

FOREIGN PATENT DOCUMENTS

GB 2473376 A 12/2009

OTHER PUBLICATIONS

Faruquie et al., "Protecting Sensitive Customer Imnformation in Call Center Recordings", Sep. 2009, IEEE International Comnfernce on Services Computing, pp. 81-88 (Year: 2009).*

(Continued)

*Primary Examiner* — Kenneth W Chang
(74) *Attorney, Agent, or Firm* — Vobach IP Law, LLC

(57) ABSTRACT

In accordance with one embodiment, an apparatus is provided that includes a computer processor coupled with a call center device positioned to receive an input communication containing PII data and originating from a telephone caller, wherein the computer processor implements code to suppress at least a portion of the received PII data without requiring a physical interrupt of the input communication so that the received PII data is not conveyed to a call center agent or to a computer of the call center agent.

20 Claims, 10 Drawing Sheets

(56) References Cited

U.S. PATENT DOCUMENTS

| | | | |
|---|---|---|---|
| 6,871,213 B1 | 3/2005 | Graham | |
| 7,130,800 B1 | 10/2006 | Currey et al. | |
| 8,275,115 B1* | 9/2012 | Everingham | H04M 3/5166 379/266.01 |
| 8,315,867 B1* | 11/2012 | Blair | G10L 21/045 704/251 |
| 8,582,764 B2 | 11/2013 | Van Volkenburgh | |
| 8,619,951 B2 | 12/2013 | Johansen et al. | |
| 8,639,920 B2* | 1/2014 | Stack | G06F 21/10 726/4 |
| 8,706,486 B1 | 4/2014 | Devarajan et al. | |
| 8,750,417 B2 | 6/2014 | Zhu et al. | |
| 8,750,471 B2 | 6/2014 | Tew et al. | |
| 8,831,204 B1* | 9/2014 | Pycko | H04M 3/5166 379/283 |
| 8,958,557 B2 | 2/2015 | Watson et al. | |
| 9,100,484 B1* | 8/2015 | Kleck | H04M 3/5183 |
| 9,160,853 B1 | 10/2015 | Daddi | |
| 9,178,974 B2 | 11/2015 | Ross et al. | |
| 9,307,084 B1 | 4/2016 | Pycko | |
| 9,699,317 B1 | 7/2017 | Pycko | |
| 9,858,573 B2 | 1/2018 | Tew et al. | |
| 9,881,178 B1 | 1/2018 | Brown et al. | |
| 10,402,826 B2 | 9/2019 | Tew et al. | |
| 10,956,605 B1 | 3/2021 | Brown et al. | |
| 11,049,108 B2 | 6/2021 | Tew et al. | |
| 11,445,363 B1 | 9/2022 | Brown et al. | |
| 12,126,991 B1 | 10/2024 | Brown | |
| 2003/0069804 A1* | 4/2003 | Barry | G06Q 30/0613 705/26.8 |
| 2004/0213390 A1 | 10/2004 | Lazarus | |
| 2005/0246242 A1* | 11/2005 | Proctor | G06Q 30/0635 705/26.81 |
| 2005/0273842 A1* | 12/2005 | Wright | G06F 21/6254 726/1 |
| 2006/0190263 A1 | 8/2006 | Finke | |
| 2007/0106892 A1* | 5/2007 | Engberg | H04L 9/0825 713/168 |
| 2007/0174390 A1 | 7/2007 | Silvain | |
| 2007/0242658 A1 | 10/2007 | Rae | |
| 2008/0224906 A1* | 9/2008 | Plamondon | H03M 7/30 341/76 |
| 2008/0291901 A1 | 11/2008 | Stratton | |
| 2009/0046841 A1 | 2/2009 | Hodge | |
| 2009/0199015 A1 | 8/2009 | Krishnapuram | |
| 2009/0310774 A1 | 12/2009 | Hendricks | |
| 2010/0167692 A1 | 7/2010 | Haynes | |
| 2010/0202611 A1* | 8/2010 | Watson | G06F 21/6245 380/210 |
| 2010/0241844 A1 | 9/2010 | Hussain | |
| 2010/0257612 A1 | 10/2010 | McGuire | |
| 2011/0228919 A1 | 9/2011 | Tew | |
| 2011/0317828 A1 | 12/2011 | Corfield | |
| 2012/0027195 A1 | 2/2012 | Shaffer | |
| 2012/0288082 A1* | 11/2012 | Segall | H04M 3/5158 379/266.07 |
| 2013/0024368 A1* | 1/2013 | Scammell | G06Q 30/06 705/40 |
| 2013/0067245 A1 | 3/2013 | Horovitz | |
| 2013/0244632 A1* | 9/2013 | Spence | H04M 3/51 455/415 |
| 2013/0266127 A1* | 10/2013 | Schachter | G10L 25/48 379/88.01 |
| 2014/0032219 A1 | 1/2014 | Lerner | |
| 2014/0100975 A1 | 4/2014 | Van | |
| 2014/0115710 A1 | 4/2014 | Hughes | |
| 2015/0073951 A1 | 3/2015 | Ladd | |
| 2015/0195406 A1 | 7/2015 | Dwyer | |
| 2015/0281446 A1 | 10/2015 | Milstein | |
| 2015/0324592 A1 | 11/2015 | Dutta | |
| 2016/0196440 A1 | 7/2016 | O'Hare | |
| 2016/0234175 A1 | 8/2016 | Zhao | |
| 2016/0379010 A1* | 12/2016 | Farkash | G06F 21/6245 726/1 |
| 2017/0026516 A1 | 1/2017 | Westlake | |
| 2017/0162187 A1 | 6/2017 | Ohtani | |
| 2021/0194939 A1 | 6/2021 | Forsyth et al. | |

OTHER PUBLICATIONS

Faruquie et al., Protecting Sensitive Customer Information in Call Center Recordings, Oct. 2009, IEEE International Conference on Services Computing, pp. 81-88 (Year 2009).

Blackwell, Clive, The management of online credit card data using the Payment Card Industry Data Security Standard, Nov. 2008, Third International Conference on Digital Information Management, pp. 838-843 (Year 2008).

* cited by examiner

METHOD AND APPARATUS FOR PROTECTING SENSITIVE DATA

CROSS-REFERENCE TO RELATED APPLICATIONS

The present application is a continuation of U.S. non-provisional patent application Ser. No. 15/882,388 titled "Method and Apparatus for Protecting Sensitive Data" and filed on Jan. 29, 2018 which is a continuation of U.S. non-provisional patent application Ser. No. 15/170,723 titled "Method and Apparatus for Protecting Sensitive Data" and filed on Jun. 1, 2016 (which issued as U.S. Pat. No. 9,881,178) which claims the benefit of U.S. Provisional Patent Application No. 62/221,964, titled "Method and Apparatus for Extracting DTMF Signals in a Call Center Environment" and filed on Sep. 22, 2015, as well as U.S. Provisional Patent Application No. 62/291,288, titled "Method and Apparatus for Protecting Sensitive Data" filed on Feb. 4, 2016, as well as U.S. Provisional Patent Application No. 62/331,938, titled "Method and Apparatus for Protecting Sensitive Data" filed on May 4, 2016—which are each hereby incorporated by reference in their entirety and for all purposes.

SUMMARY

In accordance with one embodiment, an apparatus is provided that includes a computer processor coupled with a call center device positioned to receive an input communication containing personally identifiable information (PII) data and originating from a telephone caller, wherein the computer processor implements code to suppress at least a portion of the received PII data without requiring a physical interrupt of the input communication so that the received PII data is not conveyed to a call center agent or to a computer of the call center agent.

In accordance with one embodiment, a method is provided that includes receiving at a call center an input communication originating from a telephone caller and comprising Personally Identifiable Information data; and suppressing at least a portion of the received PII data without requiring a physical interrupt of the input communication, so that the received PII data is not conveyed to a call center agent or to a computer of the call center agent.

Further embodiments will be apparent to those of ordinary skill in the art from a consideration of the following description taken in conjunction with the accompanying drawings, wherein certain methods, apparatuses, and articles of manufacture are illustrated. This Summary is provided to introduce a selection of concepts in a simplified form that are further described below in the Detailed Description. This Summary is not intended to identify key features or essential features of the claimed subject matter nor is this Summary intended to be used to limit the scope of the claimed subject matter. Other features, details, utilities, and implementations of the claimed subject matter will be apparent from the following more particular written Detailed Description of various embodiments as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification.

DETAILED DESCRIPTION

Figure 1:
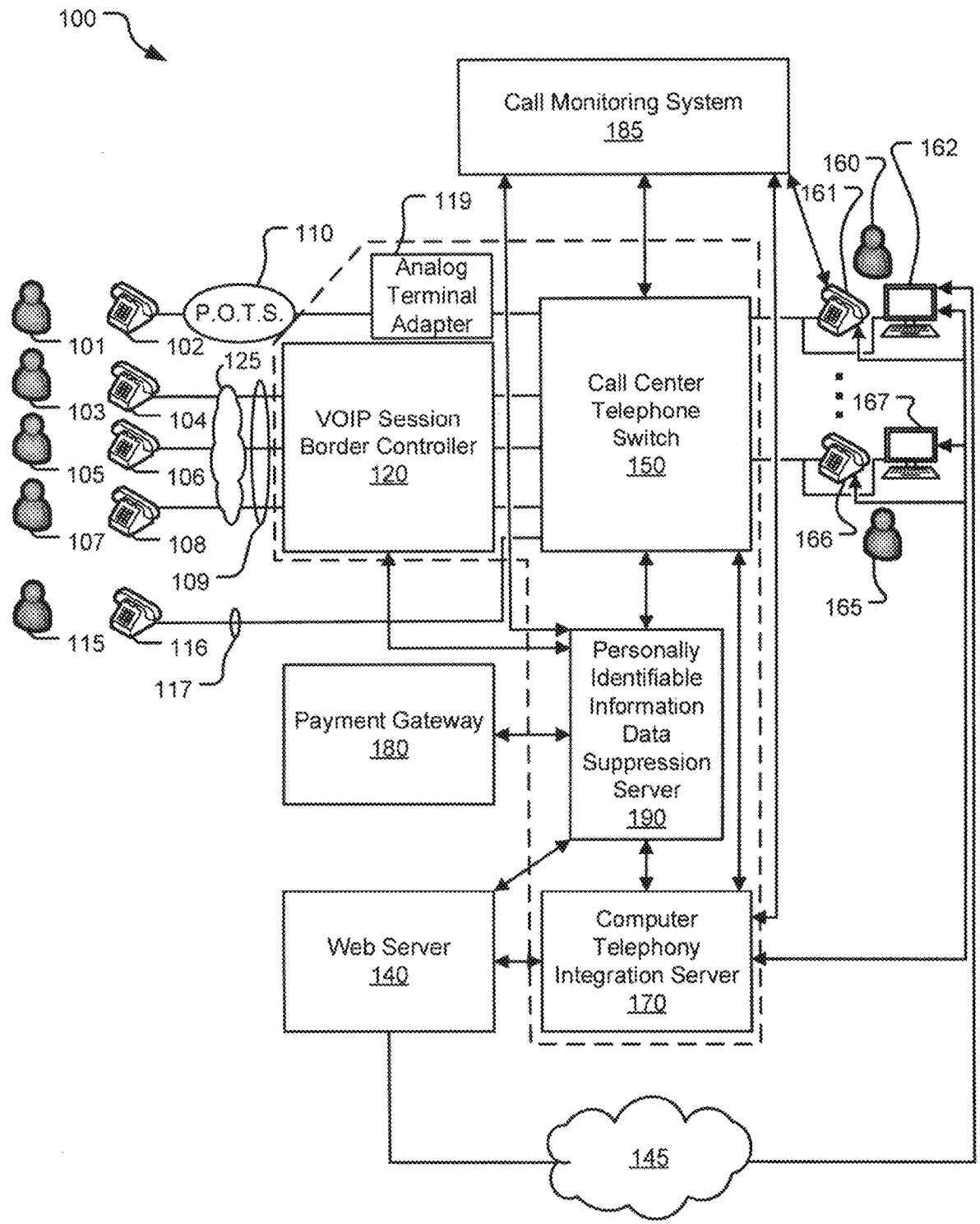
FIG. 1 illustrates an example of a telecommunications system in accordance with one embodiment.

Consumers frequently give sensitive information, such as their credit card information, to call center operators during a transaction. Sensitive data can include confidential information, private financial information, or private health information, for example. One category of sensitive information has become known as Personally Identifiable Information (PII) data. This data can include a user's social security number, date of birth, credit card information, and PIN numbers, for example. With respect to the Payment Card Industry-Data Security Standard (PCI-DSS), for example, this information can include cardholder data, such as the full PAN, cardholder name, expiration date, service code, validation codes/values, full track data, PINs and PIN blocks. While in the past it has been common for consumers to provide this information verbally during a call with a live operator (i.e., by spoken word) or by typing in numbers on a handset (which are then communicated as Dual Tone Multi Frequency (DTMF) transmissions) when utilizing an Interactive Voice Response (IVR) system, the growth of consumer fraud has given consumers concerns about openly providing such information. Namely, a dishonest call center agent might keep a copy of the PII data when the information is recited over the phone. Even the entry of DTMF tones via the user's handset can be recorded and converted to actual numbers by a receiving party. Thus, a dishonest call center agent might record the DTMF tones and convert them to actual numbers. Additionally, when consumers are in "open air" environments such as on public transportation or at a coffee shop, providing PII data verbally can expose this sensitive data to anyone within close proximity. Thus, not only is sensitive data at risk when entered via existing systems, but also consumers are hesitant to provide it verbally.

Moreover, in a call center environment, it is not uncommon for the call center to utilize call monitoring systems or agents. Call monitoring (sometimes referred to as quality monitoring) is often implemented by recording a conversation between a caller and a call center agent. The call center agent then reviews the interaction between caller and call center agent to assess quality. To prevent the PII data from being recorded and stored on physical media, the call monitoring or recording is often paused during PII data collection so that the PII data is not recorded. Thus, quality monitoring is interrupted to some degree in present systems.

In addition, some financial and privacy regulations or standards can govern the storage of sensitive data, such as PII data. One example is the Payment Card Industry Data Security Standard (also referred to herein as PCI-DSS) that requires any device that receives PII data to satisfy the PCI-DSS standard. A device is referred to as being "in scope" with the PCI-DSS if the device receives PII data. In accordance with some standards, such as PCI-DSS, it is improper to retain PII data longer than is necessary to accomplish a task for which the PII data was submitted by a consumer. In such an instance, it can be a violation of the terms and conditions of the standards, if PII data is retained when no longer needed. Other examples of regulating standards are HIPPA and FFIEC.

In accordance with one embodiment described herein, sensitive data, such as PII data, that is submitted by a caller can now be suppressed at a call center location before the PII data is conveyed beyond the call center (e.g., outside the PCI-DSS scope applicable to the call center) to a call center agent's telephone or computer. This embodiment will be described using PII data as the sensitive data; but, the example applies equally to all types of sensitive data.

When others have tried to suppress PII data in the past, they have had to rely upon physically terminating a call and then re-generating the call with selected PII data removed. This process of having to physically terminate a call and then physically regenerate the call introduced multiple opportunities for communication to be lost. Moreover, it required physical equipment for each communication line. For a large call center (e.g., one having hundreds of call center agents), such physical equipment could be quite expensive. And, the maintenance and troubleshooting of the physical equipment could be difficult and expensive, as well.

Another way in which others tried to suppress PII data was to outfit each call center agent computer with a hardware device that could be used to suppress information. However, the use of such devices can be easily subverted by a dishonest call center agent. Moreover, hardware devices were required for the computer/telephone of each call center agent at a call center. Again, such a system is difficult to maintain and troubleshoot. Furthermore, trying to make all the computers of a large call center PCI-DSS compliant would be an extremely costly and difficult task.

FIG. 1 illustrates an example of a telephone system 100 in which a telephone caller can submit sensitive information, such as PII data, and in which at least a portion of the sensitive information can be suppressed. The system does not require a call to be physically terminated and then re-generated; and, it does not require special add-on hardware devices to be used at the call center agent's computer. In FIG. 1, a call center takes calls from a variety of consumers. The calls are handled by call center agents who field questions from the callers, e.g., via a customer relationship management (CRM) system, implemented by web server 140, for example. While the consumers are referred to as "callers" in this example embodiment, it should be appreciated that some correspondence might emanate from a consumer's computer. In that instance the computer is also considered a caller. One example of this is an instant message (IM) that is sent to a computer used by a call center agent.

As part of the interaction between the callers and the call center agents, a caller will sometimes submit PII data. The caller might do this by speaking the numbers of a credit card, for example, in which case the spoken PII data constitutes PII data. Or, the caller might do so by using the touch-tone keys of a telephone, in which case the dual tone multi-frequency tones generated by the telephone constitutes PII data. Similarly, the caller might do so by entering the numbers via a computer interface and implementing a submit operation, in which case the digital embodiment of the numbers constitutes PII data.

When entered by machine, the numbers are often conveyed from a sender's transmitter as dual tone multi frequency tones. Such tones can be identified by a receiver and converted into the original numbers. Each number between 0 and 9, as well as any available wildcard characters are assigned a particular dual tone multi frequency. Such DTMF transmissions in the telephony environment are readily understood by those of ordinary skill in the art. When entered in other ways, applicable recognition systems can be utilized. For example, a voice recognition system could be used to recognize spoken numbers.

The call center can receive incoming communications from a variety of callers. FIG. 1 shows caller 101 who uses handset 102 and the plain old telephone system (P.O.T.S.) network 110 to communicate with a call center telephone switch 150. An analog terminal adapter (ATA) 119, for example, can be used to convert the analog signal from the POTS network to a digital signal. FIG. 1 is simplified to show elements of a communication system; but, a person of ordinary skill in the art will appreciate that some intermediary devices might not appear for purposes of clarity. Similarly callers 103, 105, and 107 communicate via their respective telephone handsets 104, 106, and 108. These callers use Voice Over IP (VOIP) devices to communicate via Session Initiation Protocol (SIP) via SIP trunk lines 109, for example, with a VOIP Session Border Controller server 120. The VOIP Session Border Controller server 120 receives the calls via a communication network 125, such as the internet, and can pass the calls to the call center telephone switch 150. Similarly, caller 115 can use handset 116 to send a communication across a digital transmission line 117, such as a T-1 line, to the call center telephone switch 150. The callers shown in FIG. 1 are some examples of different callers. Other types of communication schemes can be implemented between callers and the call center telephone switch, as well, as would be appreciated by one of ordinary skill in the art.

The VOIP Session Border Controller can reside at a call center along with other portions of the call center equipment. A Personally Identifiable Information Data Suppression Server 190 can be coupled with the VOIP Session Border Controller. In the embodiment shown in FIG. 1, the Personally Identifiable Information Data Suppression Server can provide the VOIP Session Border Controller with an instruction to watch for PII data, for example.

The call center telephone switch 150 connects (e.g., communicatively couples) a particular caller with a particular call center agent. FIG. 1 shows a series of call center agents. Each agent can have a telephone as well as a computer that is communicatively coupled with the call center telephone switch. For example, FIG. 1 shows a first call center agent 160 who has a telephone handset 161 and computer 162. Also, shown is call center agent 165 who has a telephone handset 166 and computer 167. The number of call center agents can vary from business to business. For example, a large credit card issuer can utilize several call centers located throughout the country or the world and utilize hundreds of call center agents at each call center. A smaller business might only require a few call center agents.

The call center telephone switch 150 can be programmed to follow a set of rules that indicates which call center agent should handle a call from a particular caller. For example, the call center telephone switch can route an incoming call to an appropriate call center agent based upon characteristics of the incoming call, such as automatic number identification (ANI). One example of a call center switch is an automatic call distributor (ACD). In FIG. 1, the Call Center Telephone Switch is shown communicatively coupled with a Call Monitoring System 185, a VOIP Session Border Controller 120, a Personally Identifiable Information Data Suppression Server 190, and a computer telephony integration (CTI) server 170, and equipment used by call center agents.

FIG. 1 also shows a computer telephony integration (CTI) server 170. The computer telephony integration server can be programmed to provide further enhancements to the functionality of the call center telephone switch. For example, the CTI server can be programmed to assist with call routing based on an incoming caller's telephone number or automatic number identification. The CTI server can also be used for call reporting. And, the CTI server can be used for voice recording integration so as to use data from the CTI server to enhance the voice messaging provided to a caller on an incoming call. Moreover, the CTI server can keep track of which incoming line is in communication with which call center agent and that agent's respective computer and telephone line. By monitoring the activity of an agent, the CTI server can help determine when sensitive data, such as PII data, is about to be provided by a user. In FIG. 1, the CTI server is shown coupled with the Call Monitoring System 185, the Call Center Telephone Switch 150, the Personally Identifiable Information Data Suppression Server 190, and the Web Server 140, as well as the phones and computers of the call center agents.

FIG. 1 also shows a payment gateway 180. The payment gateway can be a secure server located remotely from a call center and used to process payments received via the call center. For example, the payment gateway can be a credit card processing center that processes payment information submitted by a cardholder and that verifies that the cardholder's credit card account has sufficient credit for the desired purchase. In the example of FIG. 1, the Payment Gateway is shown coupled with the Personally Identifiable Information Data Suppression Server 190, from which the Payment Gateway can receive PII data.

FIG. 1 also shows a call monitoring system 185, sometimes referred to as a quality monitoring system. The call monitoring system can be used to monitor the conversations that call center agents have with callers. During a call, a conversation between a caller and an agent can be recorded for later playback or transcription or even monitored during live conversations. The Quality Monitoring System can monitor a call by being coupled to a call via the Call Center Telephone Switch 150. The call monitoring system 185 can receive commands from the Computer Telephony Integration Server 170 or the Personally Identifiable Information Data Suppression Server directing a monitoring session to begin, end, pause, and/or re-start.

FIG. 1 also shows a Personally Identifiable Information (PII) Data Suppression Server 190. The PII Data Suppression Server 190 can include a processor that runs software to cause the suppression of PII data provided by a caller to a call center. In this example, the PII Data Suppression Server 190 is shown as a separate device. However, it should be appreciated that the PII Data Suppression Server could similarly reside as part of the VOIP Session Border Controller 120, as part of the Call Center Telephone Switch 150, and/or as part of the Computer Telephony Integration Server (CTI Server) 170. It should be appreciated that in other embodiments, the PII Data Suppression Server 190 might be used to suppress sensitive information other than PII data.

In the embodiment shown in FIG. 1, the PII Data Suppression Server 190 is coupled with the Call Center Telephone Switch 150, the CTI server 170, the Payment Gateway 180, the VOIP Session Border Controller 120, a web server 140 (such as a customer relationship management web server), and the Call Monitoring System 185.

In this embodiment, the CTI server alerts the PII Data Suppression server that a call has been received by a call center agent. Also, the web server detects or is informed that a sensitive field, such as a payment field, has been activated on the agent's computer. This indicates that PII data is about to be entered. The inputs from the CTI Server 170 and web server 140 thus alert the PII data suppression server 190 that PII data is about to be provided by a caller coupled with that call center agent. The PII Data Suppression Server can instruct the VOIP Session Border Controller 120, the Call Center Telephone Switch 150, or a router (not shown) positioned on the call-center-agent-side of the Call Center Telephone Switch to suppress PII data provided by the caller. For example, when a caller enters numbers via a keypad at the caller's phone or computer and the call is implemented via a Voice Over IP (VOIP) protocol, the entered numbers will be conveyed as data packets to the VOIP Session Border Controller server 120. The number data provided by the caller will be divided up and sent by a series of packets, wherein each packet includes as payload data a portion of the number data. For example, each packet will include header information that identifies whether that packet contains a portion of the number data. Thus, by identifying the packets that contain number data during the relevant time period, the VOIP Session Border Controller server can in turn intercept and suppress sensitive PII data before the PII data reaches the call center telephone switch.

The PII Data Suppression Server needs to know when to instruct a device in the communication system to look for PII data. A caller may certainly enter numbers during a call that are not PII data, and those entered numbers do not need to be suppressed. Thus, various triggering events can be used to alert the PII Data Suppression Server that PII data is about to be entered in an on-going communication. One way to trigger the PII Data Suppression Server to implement screening for entered PII data is to signal the PII Data Suppression Server when a web server, such as web server 140 in FIG. 1, serves a payment web page to a call center agent's computer, such as computer 162 or 167 in FIG. 1. The serving of the payment web page is an indicator that payment information is about to be received. Similarly, the serving of other web pages associated with PII data could be indicators, as well. Thus, the web server 140 can notify the PII Data Suppression Server when such a payment page is served by the web server.

Another way to trigger the PII Data Suppression Server to implement screening is when a computer of a call center agent associated with a call activates a graphical user interface for the reception of PII data, such as the reception of credit card information. When such a graphical user interface is launched, for example, a signal can be sent by the call center agent's computer to the PII Data Suppression server, e.g. via the web server in order to alert the PII Data Suppression Server that the caller is about to provide PII data.

In another embodiment, a triggering signal might be generated by a call center agent's computer when the call center agent moves a cursor or other pointing device into an area of a graphical user interface that indicates PII data is about to be provided. Once again, the web server can be notified and in turn can notify the PII Data Suppression Server. In some embodiments, the web server and CTI server can be combined together.

In response to the triggering signal, the PII Data Suppression Server can communicate with one of the communication devices in the network. For example, the PII Data Suppression Server can instruct that particular communication device to identify packets that have header information designating a payload as containing number information. Depending on the system capabilities and the type of incoming phone line, the PII Data Suppression Server can signal a VOIP Session Border Controller 120, a Call Center Telephone Switch, or a router positioned on the call-center-agent-side of the call center telephone switch to suppress data.

To suppress the number data, a communications device, such as the VOIP server, can simply replace the received number data with replacement data. For example, the VOIP server can replace the received number data in the VOIP packets with data representing a neutral tone. The revised VOIP packets can then be forwarded from the VOIP server to the Call Center Telephone Switch. The Call Center Telephone Switch processes the revised VOIP packets as usual so that the call center agent assigned to the call will merely hear the neutral tones. In this fashion, the call center agent is not exposed to the PII data. Thus, there is no risk that a dishonest call center agent could record actual tones and could translate the recorded tones to actual PII data. Alternatively, rather than a neutral tone, the communication device, such as the VOIP server, could replace the intercepted number data with data representing a silent tone.

As explained further below, the communication device need not replace all of the intercepted number data with replacement data. Rather, the communication device could be instructed to merely replace some of the intercepted digits. The remaining digits can be conveyed unadulterated further downstream in the communication network and to the call center agent. For example, if the first 12 digits of a credit card number are replaced with a neutral tone and the last four digits are actual numbers from the credit card number, the call center agent will be able to hear when the caller is almost finished entering the credit card number. This helps to speed up the processing of the call, as the agent is alerted to continue with the process at hand. Moreover, it allows the agent to query the customer if a long delay without an entering of a digit indicates that the customer appears to be having trouble entering the digits.

Figure 2A:
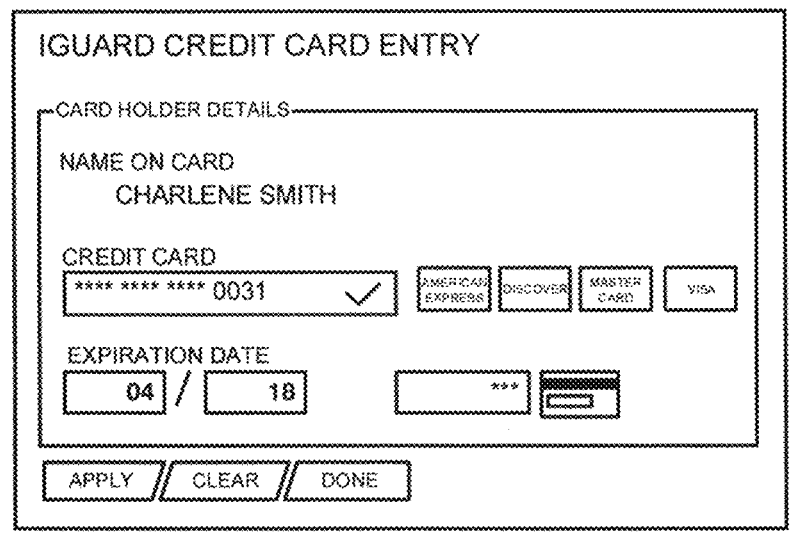
FIG. 2A illustrates an example of a user interface for the suppressing of sensitive information in accordance with one embodiment.

In addition, the PII Data Suppression server can instruct a server, such as the web server 140 or CTI server having a resident web server, to notify the computer of the call center agent that number data has been received. For example, FIG. 2A shows an example 200 of a user interface for a call center agent. When the time comes during a call for a call center agent to request payment information from a caller, the graphical user interface shown in FIG. 2A is activated. The web server receives confirmation from the PII Data Suppression server that a number has been received and in turn alerts the agent's computer that a number has been entered by the caller. The graphical user interface of the call center agent's computer in response displays an "*" or some other character in the credit card information box in order to alert the call center agent that a number has been entered by the caller. This signaling of the entering of information (without displaying all of the actual information) helps to keep the call center agent informed as to what is taking place. Thus, if a consumer does not begin entering data or does not enter all of the data, the agent can see this visually and prompt the user accordingly.

Figure 2B:
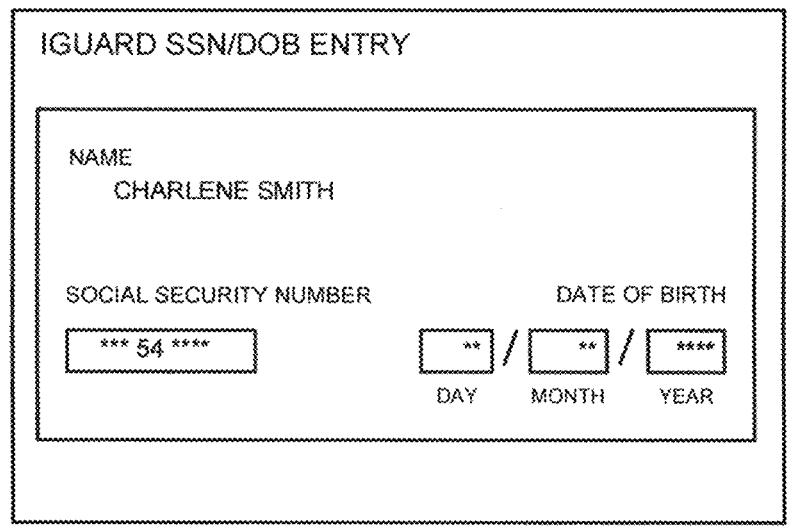
FIG. 2B illustrates an example of a user interface for the suppressing of sensitive information in accordance with another embodiment.

FIG. 2B illustrates an example of a user interface where social security information is being entered. In this example, a portion of the social security number data and birth date data is suppressed. If desired, some received numbers can be passed unadulterated from the PII Data Suppression Server to the call center agent computer, as is apparent with the "5" and "4" numbers in FIG. 2B.

In another embodiment, when the PII data Suppression server receives a number, the PII Data Suppression Server can alert the web server 140 that the number has been received. In this embodiment, the web server can then refresh the page that was served to the call center agent's computer and reflect the fact that a number has been received, for example with an "*" in the received number field of the web page.

In accordance with one embodiment, FIG. 2A shows that not all of the credit card data needs to be suppressed. For example, the last four digits of the caller's credit card number can be displayed to the call center agent via the graphical user interface. This partial listing helps the agent confirm that number data has been correctly entered, without running afoul of privacy regulations.

Similarly, FIG. 2A shows that a call center agent can ask a caller for the expiration date of her credit card. FIG. 2A also shows that the Card Security Code (CSC or CVV) information, once entered, can be disguised but indicated on the graphical user interface displayed to the call center agent. It should be appreciated that in some embodiments, one might choose to keep all of the PII data disguised. In other embodiments, one might choose to disguise only a portion of the PII data.

FIG. 1 also shows a caller 101 whose telephone handset 102 is coupled with the call center telephone switch via the plain old telephone switch network 110. Such a system conveys analog signals to the call center telephone switch. Therefore, the VOIP Session Border Controller cannot be used to suppress any data, as no VOIP packets are used for an analog line. The call center telephone switch 150 can be programmed to screen for and identify number data. A call center telephone switch 150 can be programmed via its application programming interface (API) to use a signal detector, such as a DTMF signal detector that detects DTMF signal data. For example, a device media controller could be used to identify incoming DTMF data. The Personally Identifiable Information Data Suppression Server 190 can instruct the Call Center Telephone Switch when to transmit PII data to the PII Data Suppression Server, for example, and which PII data to suppress before forwarding data to the call center agent's phone. In many instances, the PII Data Suppression Server will instruct the Call Center Telephone Switch to forward all PII data to the PII Data Suppression Server as that data is received and to suppress all of the PII data so that it is not passed along to a call center agent's phone.

FIG. 1 also shows a caller 115 whose handset 116 is coupled via a digital transmission line such as a T-1 transmission line to the call center telephone switch 150. Such a system conveys digital signals to the call center telephone switch—but not necessarily VOIP protocol signals. Once again, the call center telephone switch can be programmed to screen for number data. For example, a device media controller could be used to identify incoming DTMF data. Thus, the call center telephone switch can intercept and suppress number data when appropriate. The Personally Identifiable Information Data Suppression Server 190 can instruct the Call Center Telephone Switch when to look for PII data to intercept, suppress, and pass along to the PII server, for example, so that the data is not passed to a call center agent's phone.

As number data is intercepted by one of the various communication devices, such as a VOIP Session Border Controller, a Call Center Telephone Switch, or a router, the intercepted number data can be sent from the communication device to the PII Data Suppression Server. The PII Data Suppression Server can then accumulate the PII data and pass the data to a payment server at an appropriate time. The PII Data Suppression Server may also obtain non-sensitive data from the CTI server that can be used as part of a payment event. Thus, a communication device can be instructed to not only suppress sensitive information so that the sensitive information is not passed on to a call center agent but also to relay the sensitive information to the PII Data Suppression Server for secure processing.

In accordance with one embodiment, sensitive information intended for a call center can be physically contained or secured so as to be within scope of applicable standard(s). For example, the PCI-DSS standard requires that PII data be maintained securely by devices that are PCI-DSS compliant. In a call center environment where many hundreds of call center agents work, it can be untenable to make sure that all of the call center agents' computers and telephones are compliant with the PCI-DSS standard or some other standard. Thus, the embodiment discussed in FIG. 1 is useful in that it reduces the number of devices that need to be within the scope of the PCI-DSS standard or some other standard. FIG. 1 shows a dashed line surrounding the VOIP Session Border Controller server 120, the Call Center Telephone Switch 150, the CTI server 170, and the PII Data Suppression Server 190. In the example of FIG. 1, the devices surrounded by the dashed line can be maintained as PCI-DSS standard compliant, while the rest of the communication system need not be. This provides an enormous cost saving to a call center in that it eliminates the tremendous effort that would be required to make all of the call center agents' devices PCI-DSS standard compliant, if they received PII data. Moreover, it makes the system more secure and protects the data of consumers. In view of the highly publicized data breaches that have occurred in recent years, the disclosed embodiment serves an important purpose in protecting sensitive data. It should be noted that these devices within the dashed line can all be located within a secure facility, such as a secure server room at a call center, in order to implement physical security.

It should be noted that the system shown in FIG. 1 could be used to store PII data in the call center for a limited period of time that is warranted. PII data may need to be stored temporarily so that it can be relayed to a payment gateway; but, once the PII data is no longer needed, it should be deleted. The implementation described in FIG. 1 permits this as the communication of the PII data can be limited to a few highly secured devices and then deleted when no longer needed. Moreover, the PII data can be retained in the registers of a processor of the PII Data Suppression Server without saving the PII data to a storage device. This helps to prevent the unnecessary storage of the PII data. For example, it prevents the storage of transient PII data to a physical storage device before handing off the PII data to an adjunct process. Stated another way, it prevents the non-register storage of PII data before handing off the PII data to an adjunct process.

Figure 3:
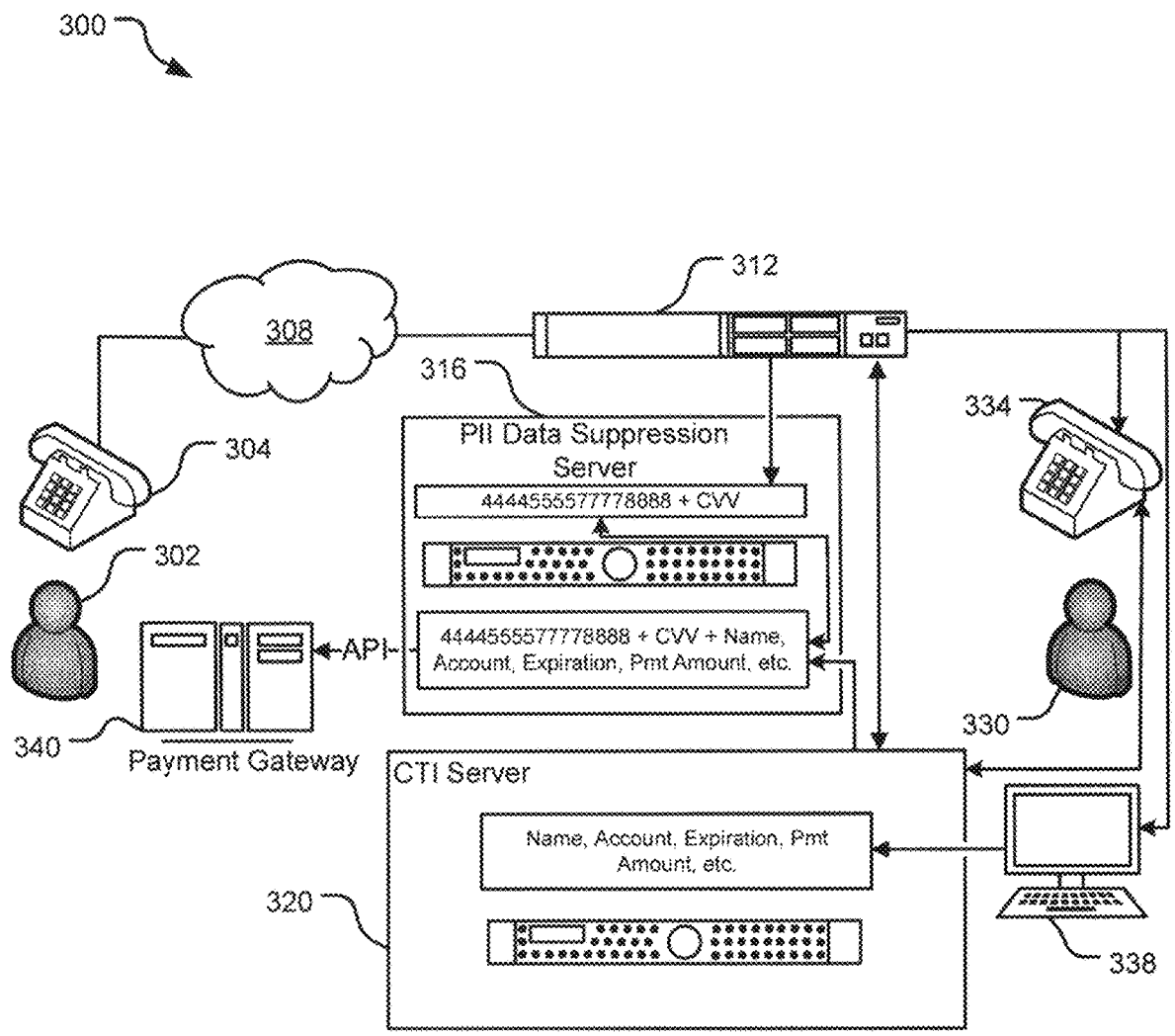
FIG. 3 illustrates an example of a telecommunications system for suppressing sensitive information in accordance with one embodiment.

FIG. 3 illustrates an example system 300 that shows how PII data can be conveyed. In system 300, a caller 302 utilizes a communication device, such as a telephone handset 304, to communicate across a network 308 with a call center telephone switch 312, such as an automatic call distributor (ACD). The call center telephone switch is coupled with a computer telephony integration server 320. The call center telephone switch distributes incoming calls to various call center agents, such as call center agent 330. Call center agent 330 uses a communication device, such as telephone 334, and a computer, such as computer 338, which are coupled with the CTI server. Also shown as part of the system in FIG. 3 is a PII Data Suppression Server 316 and a payment gateway 340, each of which is coupled with the CTI server. In the embodiment of FIG. 3, a web server can be incorporated with the CTI server.

In the embodiment of FIG. 3, the PII Data Suppression Server instructs the call center telephone switch to look for PII data to intercept. The call center telephone switch can identify any incoming data that represents DTMF tones whether in a digital or analog incoming signal. For example, the call center telephone switch can be instructed by the PII Data Suppression Server to use the call center telephone switch's device media controller to listen for DTMF tones sent by a particular caller, regardless of whether the incoming signal is delivered via SIP, POTS, or T-1. The intercepted PII data is conveyed from the call center telephone switch to the PII Data Suppression Server. Via an application programming interface (API), the PII Data Suppression Server sends the intercepted PII data to a payment gateway. The PII Data Suppression Server also instructs the CTI server to alert the call center agent's computer that PII data has been—or is being—received. However, the CTI server and PII Data Suppression Server do not convey the entire set of PII data to the call center agent's computer. Instead, at least a portion of the PII data is disguised so that the call center agent cannot determine the entire set of PII data. Conversely, a portion of the PII data can be left undisguised, in order that the call center agent can see that data is being entered correctly. For example, by not disguising the first few numbers of a credit card number, the call center agent can verify that an appropriate number is being entered for a particular type of card—e.g., Visa credit card account numbers start with a "4." Once the call center agent has confirmed that the appropriate amount of data has been submitted by the caller, the call center agent can submit the information via clicking on a submit icon, for example. This submission signals the CTI server to pass non-PII data, such as payment amount, to the PII Data Suppression Server. The PII Data Suppression Server merges the non-PII data with the PII data held by the PII Data Suppression Server register(s) and transmits the complete set of data to the payment gateway. Once payment is processed, the PII data can be discarded from the processor registers of the PII Data Suppression Server. Again, this example uses a CTI server that has a resident web server for communicating with the call center agent's computer.

It should be appreciated that the PII Data Suppression Server can retain PII data in its register(s) for a short period of time in order to allow the data to be re-used, as necessary. For example, when a travel agency processes credit card information for an airline reservation, the data can be retained for use in also making a hotel reservation. This avoids the process of asking the consumer to re-enter the credit card information for each reservation that is made during the call.

Figure 4:
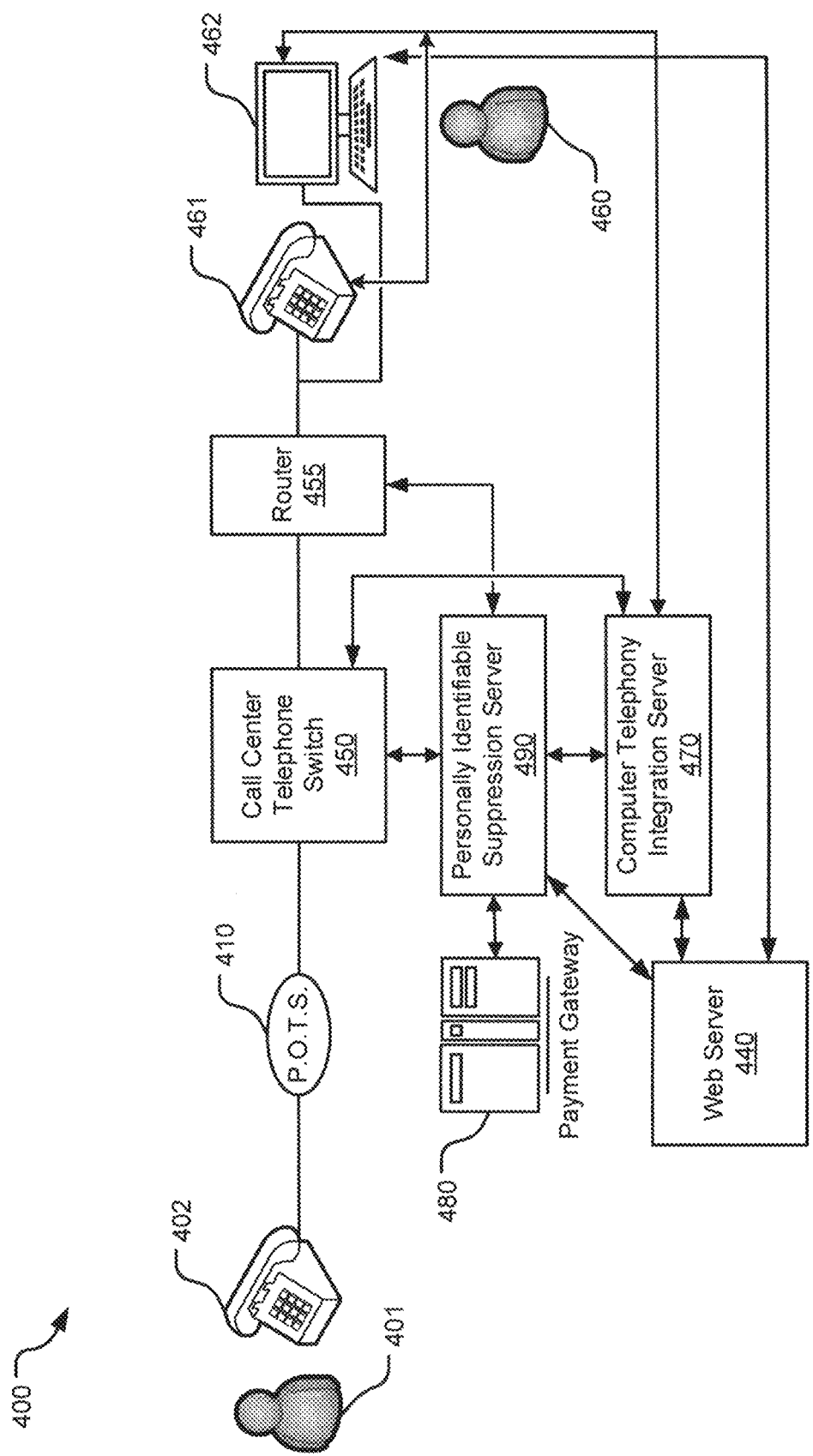
FIG. 4 illustrates an example of a telecommunications system for suppressing sensitive information in accordance with another embodiment.

FIG. 4 illustrates an embodiment for suppressing sensitive data, such as PII data. In this example, a caller 401 places a call via a handset 402. The call is routed via an analog line and via the Plain Old Telephone System (POTS) network 410. A Call Center Telephone Switch 450 receives the incoming analog signal and converts it to a VOIP outgoing signal. This allows the Call Center Telephone Switch to route the call via an internal VOIP network, for example. The outgoing signal is routed through router 455 to user 460 via handset 461 or computer 462. FIG. 4 also shows a Computer Telephony Integration Server 470, a Personally Identifiable Information Data Suppression Server 490, a Web Server 440, and a Payment Gateway 480.

In one embodiment, the router is programmed to do a packet analysis in order to intercept all packets that contain DTMF data. As the DTMF data is received and suppressed, it is forwarded to the PII Data Suppression Server. If the PII Data Suppression Server has been notified that a payment event is taking place, then the PII Data Suppression Server can maintain the data in safe keeping. If a PII data operation is not taking place, the PII Data Suppression Server can pass the information to the Web Server which can pass it to the call center agent's computer.

In one embodiment, when a triggering event occurs that indicates that sensitive information is about to be sent, e.g., as described herein, the Personally Identifiable Information Data Suppression Server 490 can instruct the router 455 to suppress the sensitive data. For example, this can be accomplished by instructing the router to identify packets that contain numerical data, removing the numerical data, and forwarding on nonce data in place of the numerical data. This embodiment is useful when a Call Center Telephone Switch is not equipped to suppress data. Preferably, this implementation would physically locate the router within an area that is PCI-DSS compliant so as to be in conformance with that standard, if the PCI-DSS standard is being implemented.

In an alternative embodiment, the Call Center Telephone Switch might not be able to suppress the DTMF data but could be able to identify and forward the DTMF data. In such an instance, the Call Center Telephone Switch could be programmed to forward the intercepted numerical data to the PII Data Suppression Server 490 while the router would perform the function of suppressing the numerical data. For example, the router could be programmed with an access control list on the configuration of the router to cause the router to do packet analysis of any packets coming from the call center telephone switch and strip out any DTMF information from those packets.

Figure 5:
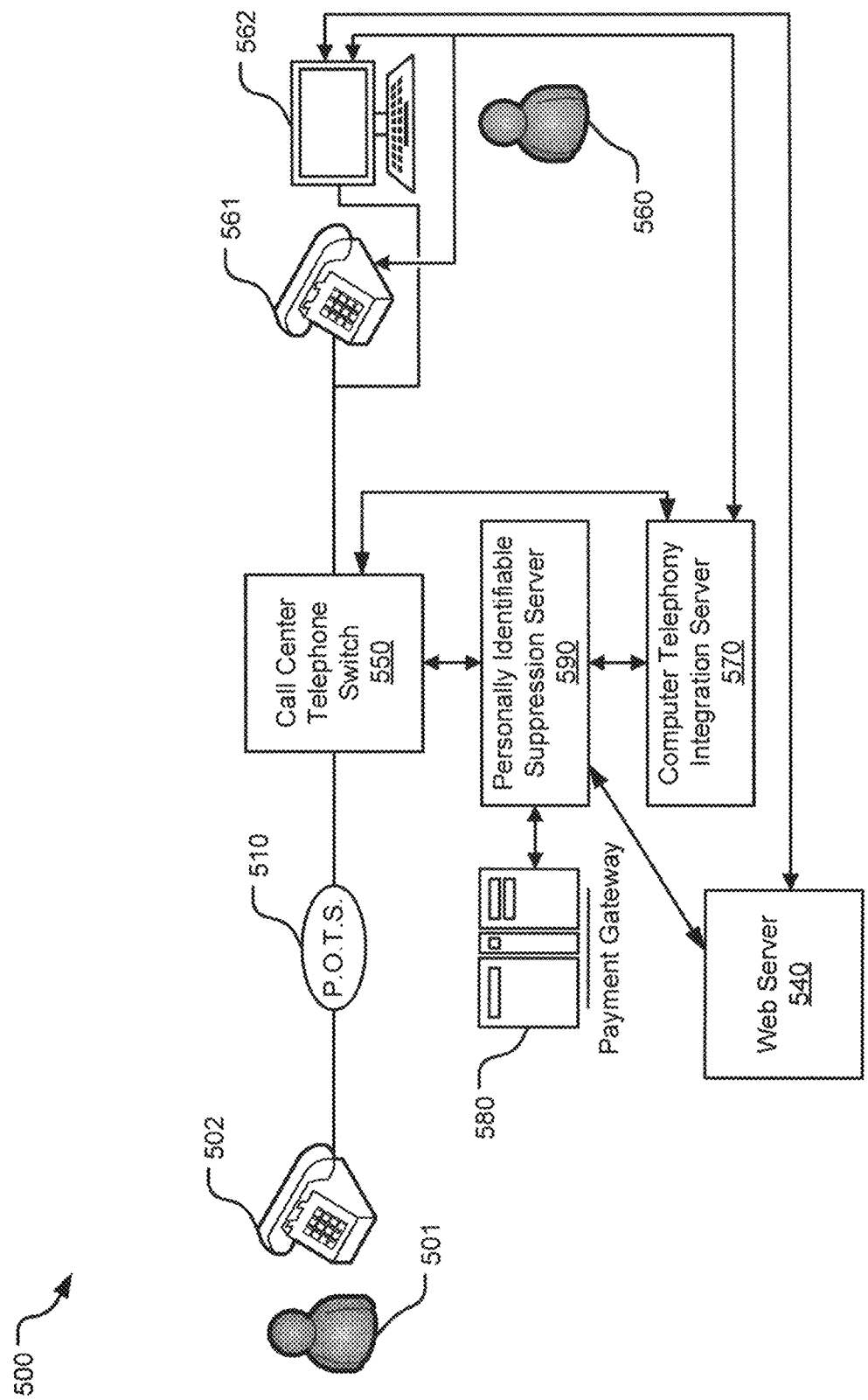
FIG. 5 illustrates an example of a telecommunications system for suppressing sensitive information in accordance with yet another embodiment.

FIG. 5 illustrates an embodiment for suppressing sensitive data in a system where the communication is sent via analog communication lines. In FIG. 5, a caller 501 makes a call via handset 502 and via the plain old telephone system 510. The communication is carried by analog lines to the Call Center Telephone Switch 550. The Call Center Telephone Switch routes the call via an analog communication line to a call center agent 560 via a telephone handset 561 and/or via a computer 562.

When a triggering signal is received by the Personally Identifiable Information Data Suppression Server 590 indicating that sensitive data is about to be entered, e.g., as described herein, the PII Data Suppression Server can instruct the Call Center Telephone Switch to mute part of the sensitive information. For example, the Call Center Telephone Switch can detect DTMF tones for each of the transmitted digits. The Call Center Telephone Switch can mute some of these tones by replacing the tones with no tone or a neutral tone. Thus, the call center operator is prevented from hearing all of the tones. The complete string of characters can be sent to the PII Data Suppression Server by the Call Center Telephone Switch. The PII Data Suppression Server can then pass the PII data to the Payment Gateway. The Web Server 540 could be pre-programmed only to show all placeholder values, such as an asterisk, or a combination of actual numbers and placeholder values on the call center agent's computer. This allows the call center operator to follow the entry of the sensitive information without disclosing all of the sensitive information to the call center operator. This practice could similarly be employed by a quality monitoring system. The system can be flexible as to which of the numbers in a string of numbers are muted.

Figure 6:
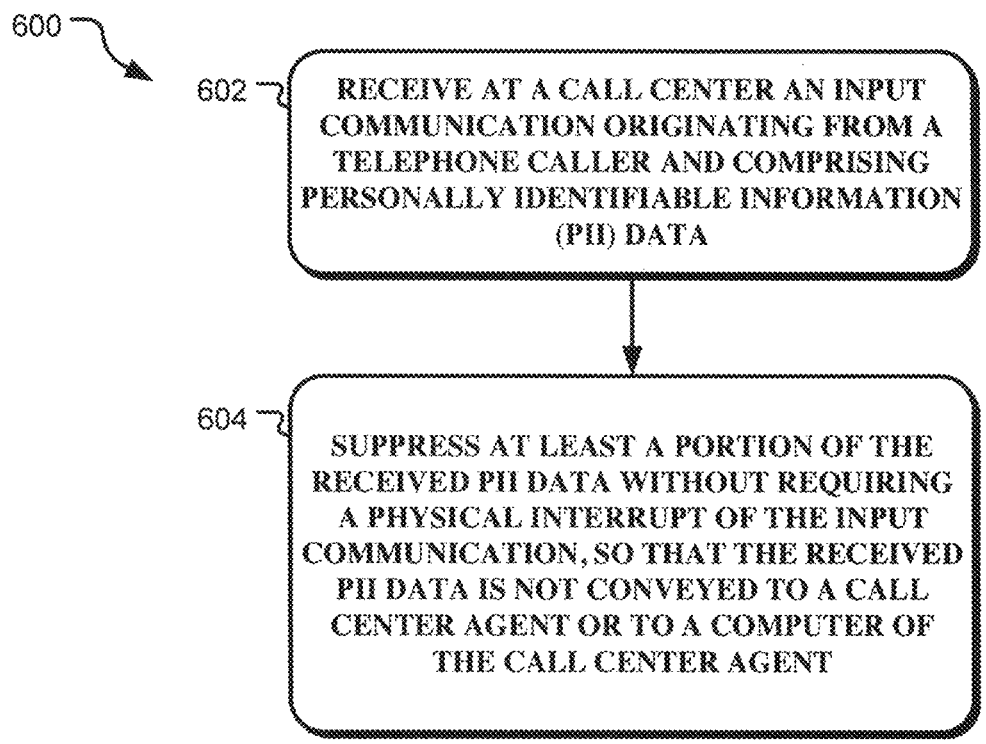
FIG. 6 illustrates a flow chart 600 that demonstrates a method of suppressing sensitive data in accordance with one embodiment.

FIG. 6 illustrates a flow chart 600 that demonstrates a method of suppressing sensitive data in accordance with one embodiment. In operation 602, a call center receives an input communication. The input communication originates from a telephone caller and comprises personally identifiable information (PII) data. In operation 604, at least a portion of the received data is suppressed. For example, at least a portion of the received PII data is suppressed without requiring a physical interrupt of the input communication. In this manner, any suppressed data is not conveyed to a call center agent or to a computer of a call center agent.

Figure 7:
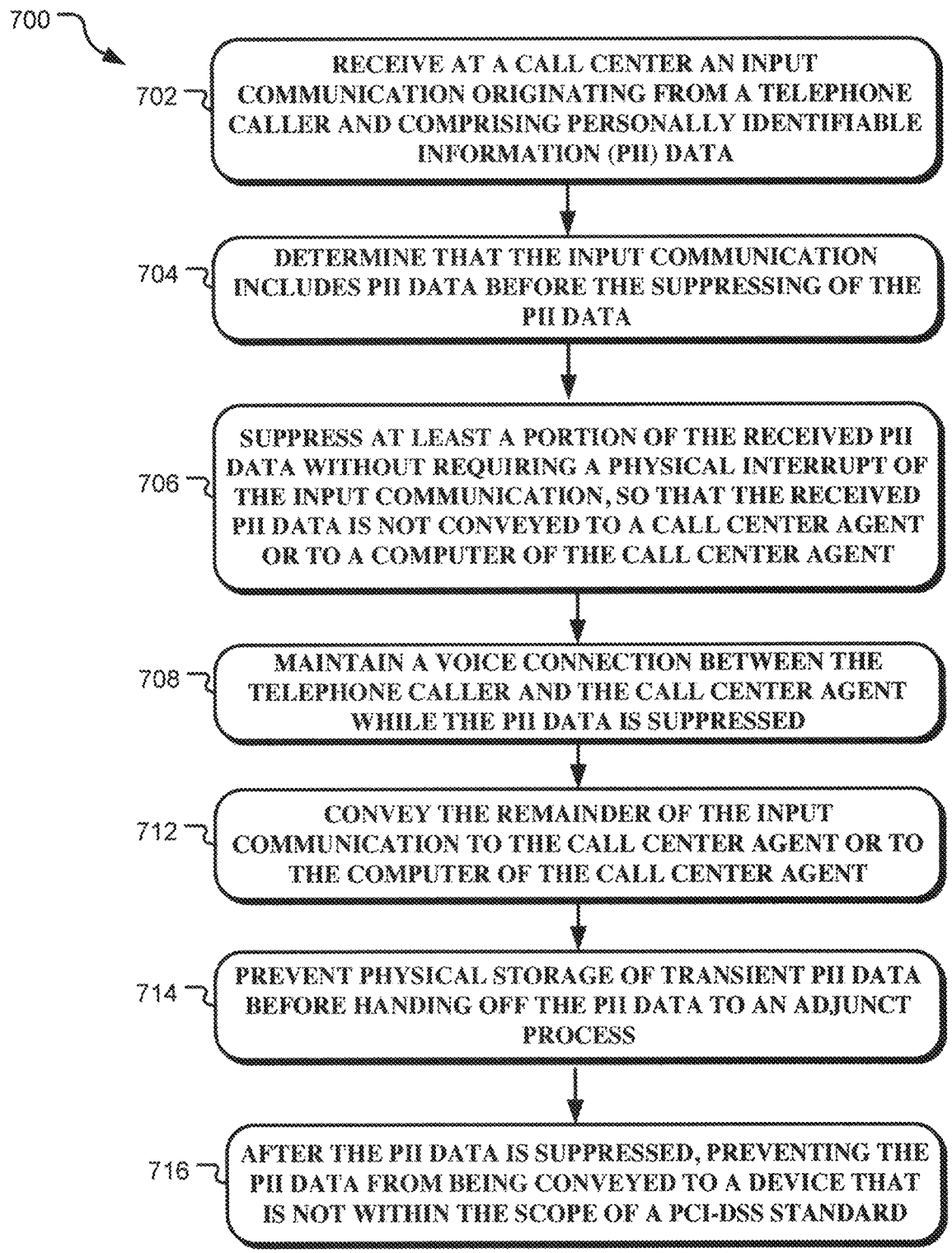
FIG. 7 illustrates a flow chart that demonstrates a method of suppressing sensitive data in accordance with another embodiment.

FIG. 7 illustrates a flow chart 700 that demonstrates yet another embodiment. In operation 702, a call center receives an input communication originating from a telephone caller and comprising sensitive data, such as personally identifiable information data. A determination is made in operation block 704 as to whether the input communication includes PII data. If the communication does include PII data, then at least a portion of the PII data can be suppressed.

Depending upon the implementation, different methods can be implemented to determine if an input communication includes PII data. For example, a signal can be sent to a PII Data Suppression Server from a web server, such as a Customer Relationship Management or payment web server, or a call center agent's computer when a payment web page has been served to a computer used by a call center agent. In accordance with another implementation, a signal can be generated from a web server, such as a Customer Relationship Management or payment web server, or a user's computer that a call center agent has activated a payment interface. Still, in another implementation, a determination can be made that a call center agent is positioning a cursor or other pointing object in a payment portion of a graphical user interface.

In operation 706, at least a portion of the received PII data can be suppressed. This can be implemented without requiring a physical interrupt of the input communication, so that the received PII data is not conveyed to a call center agent or to a computer of a call center agent.

The suppression of at least a portion of the PII data can be implemented in a variety of ways. For example, all of the PII data can be removed and not sent forward to a call center agent. Or, the PII data can be replaced with proxy data, such as proxy tone data, before the proxy tone data is sent on to the call center agent. When VOIP transmissions are implemented, VOIP packets can be intercepted and manipulated, e.g., by removing the PII data from the VOIP packets or by replacing the PII data in the VOIP packets with proxy PII data.

Notably, these methods of suppressing the PII data can be implemented without having to hardware terminate a transmission and then regenerate the communication.

A variety of devices can be utilized to intercept communications. For example, a server located between a telephone caller and a call center telephone switch can be used to intercept VOIP packets containing sensitive data. A call center telephone switch itself can be used to intercept sensitive data, such as DTMF data. Similarly, a router can be utilized to intercept sensitive data.

When a call monitoring operation is being performed, at least a portion of the received PII data can be suppressed without pausing call monitoring of the input communication. This can be implemented for example, by removing PII data from VOIP packets before they are communicated onward to the call monitoring receiver.

Operation 708 shows that a voice connection can be maintained between a caller and a call center agent when PII data is being suppressed. And operation 712 shows that the remainder of the input communication can be conveyed to the call center agent or to the computer of the call center agent.

As noted herein, some standards require that sensitive data not be stored. Thus, operation 714 illustrates that physical storage of transient PII data can be prevented before handing off the PII data to an adjunct process, such as a payment process. Similarly, operation 716 shows that after the PII data is suppressed, steps can be taken to prevent the PII data from being conveyed to a device that is not within the scope of a standard, such as the PCI-DSS standard.

Figure 8:
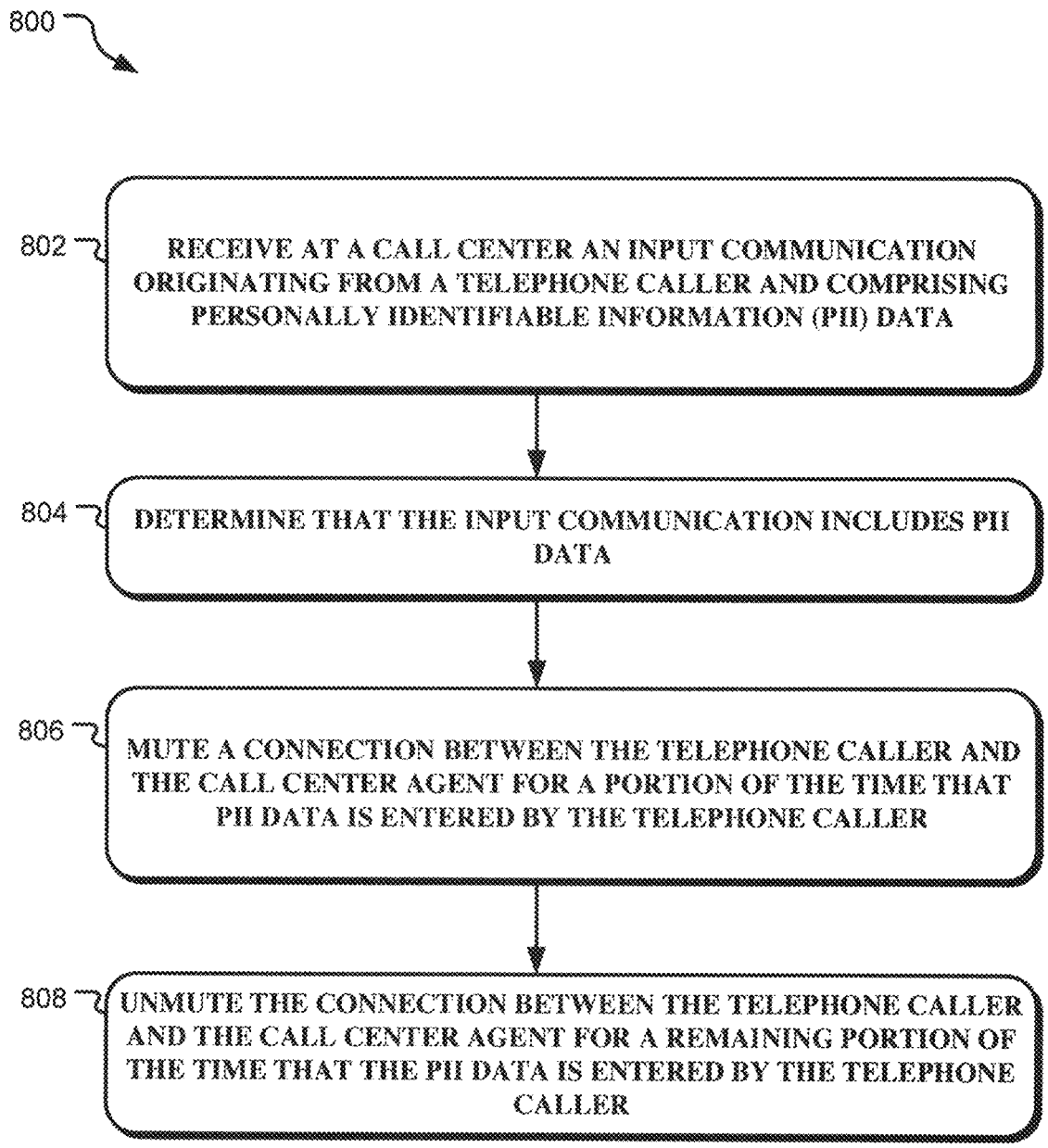
FIG. 8 illustrates a flow chart that demonstrates a method of muting and unmuting a connection between a telephone caller and a call center agent in accordance with one embodiment.

FIG. 8 illustrates another embodiment via flow chart 800. In operation 802, an input communication is received at a call center from a telephone caller. The communication includes sensitive data, such as personally identifiable information data. In operation 804, a determination is made that the input communication contains PII data.

If the input communication contains PII data, then a connection between the telephone caller and the call center agent can be muted during at least a portion of the time that the telephone caller enters PII data. For example, the audio can be muted for the middle seven numbers (or other amount of numbers) of a credit card number when a user enters the credit card information. This is illustrated by operation 806. Similarly, the connection between the telephone caller and the call center agent can be unmuted for the remaining portion(s) of the time that the PII data is entered by the telephone caller, as shown in operation 808.

Figure 9:
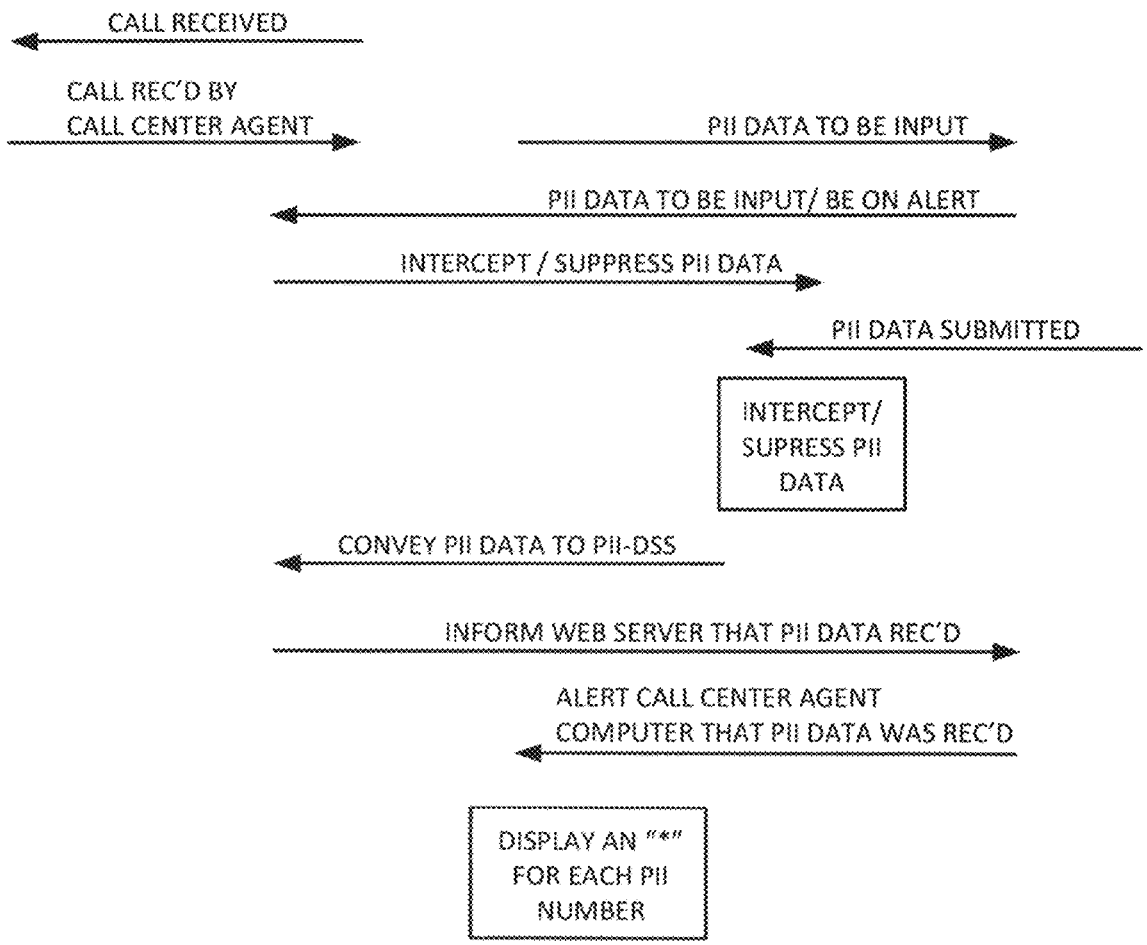
FIG. 9 illustrates a sequence diagram in accordance with one embodiment.

FIG. 9 illustrates a sequence diagram for suppressing data in accordance with the processes described herein. As can be seen in FIG. 9, a Computer Telephony Integration Server detects that a Call Center Agent computer has received a call. The CTI server notifies the PII Data Suppression Server that the telephone associated with the Call Center Agent is handling a call. When the call center agent's computer loads a payment web page or graphical user interface for payment information, the Web Server is alerted to the fact that sensitive data, such as PII data is about to be entered. The Web Server alerts the PII Data Suppression Server.

Upon being notified that PII data is ready to be entered by the caller, the PII Data Suppression Server instructs a communication device (e.g., a VOIP Session Border Controller, a Call Center Telephone Switch, or a router) to intercept and suppress any numeric data being sent by a caller to the Call Center Agent. The communication device identifies the submitted PII data and strips it from the caller's incoming communication. Moreover, the communication device sends the PII data to the PII Data Suppression Server without sending the PII data onto the Call Center Agent's phone/computer. Any non-PII data, such as voice data, is not stripped from the communication and is allowed to pass to the Call Center Agent's phone/computer.

The PII Data Suppression server accumulates and holds the PII data in one or more registers of its computer processor. The PII Data Suppression Server also informs the Web Server that the PII data has been received. The web server in turn alerts the computer of the Call Center Agent that the PII data has been received. The computer of the Call Center Agent can display a placeholder, such as an asterisk, for each number in the PII data so that the Call Center Agent can follow the entry of data on his or her computer.

Figure 10:
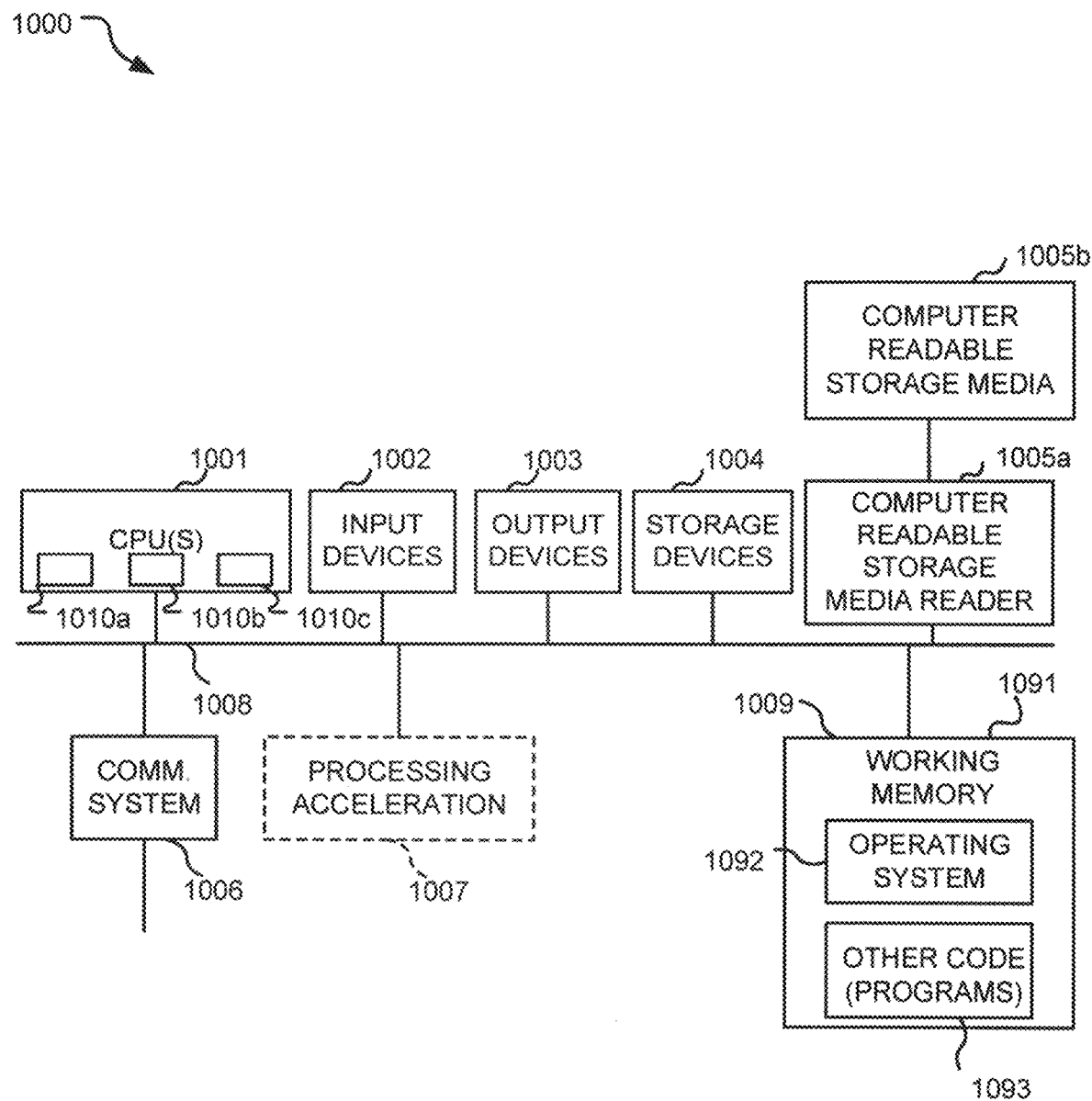
FIG. 10 illustrates a block diagram of a computer system that can be utilized to implement computer-based devices.

Each of the computers and databases described herein can be implemented by the exemplary computer system illustrated in FIG. 10. FIG. 10 broadly illustrates how individual system elements can be implemented. System 1000 is shown comprised of hardware elements that are electrically coupled via bus 1008, including a processor 1001, input device 1002, output device 1003, storage device 1004, computer-readable storage media reader 1005a, communications system 1006 processing acceleration (e.g., DSP or special-purpose processors) 1007 and memory 1009. Processor 1001 is shown having one or more registers such as registers 1010a, 1010b, and 1010c. Computer-readable storage media reader 1005a is further coupled to computer-readable storage media 1005b, the combination comprehensively representing remote, local, fixed and/or removable storage devices plus storage media, memory, etc. for temporarily and/or more permanently containing computer-readable information, which can include storage device 1004, memory 1009 and/or any other such accessible system 1000 resource. System 1000 also comprises software elements (shown as being currently located within working memory 1091) including an operating system 1092 and other code 1093, such as programs, applets, data and the like.

System 1000 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 1000 component (e.g. within communications system 1006). Customized hardware might also be utilized and/or particular elements might be implemented in hardware, software or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 1000 components will necessarily be required in all cases.

Many other devices or subsystems (not shown) may be connected in a similar manner. Also, it is not necessary for all of the devices shown in FIG. 10 to be present to practice an embodiment. Furthermore, the devices and subsystems may be interconnected in different ways from that shown in FIG. 10. Code to implement one embodiment may be operably disposed in the internal memory or stored on storage media such as removable memory, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system, code for implementing a function may be stored in the internal memory and configured to be operated by the processor or a virtual machine.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not necessarily all of the routine functions of the embodiments described herein are shown and described. It will, of course, be appreciated that in the development of any such actual embodiment, numerous implementation-specific decisions must be made in order to achieve the developer's specific goals, such as compliance with application—and business-related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a standalone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java, PUP, Python, and/or other high level language programs running on a data processing computer such as a personal computer, workstation computer, mainframe computer, or high performance server running an OS such as Microsoft-based OS, such Windows 8, Windows 7, Windows Vista™, Windows NT®, Windows XP PRO, Windows® 2000, and Windows 10, available from Microsoft Corporation of Redmond, Washington, Apple OS X-based systems, available from Apple Inc. of Cupertino, California, BlackBerry OS, available from Blackberry Inc. of Waterloo, Ontario, Android, available from Google Inc. of Mountain View, California or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, memory, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The above specification, examples, and data provide a complete description of the structure and use of exemplary embodiments. Furthermore, structural features of the different implementations may be combined in yet another implementation without departing from the recited claims.

What is claimed is:

1. A method comprising:
 establishing a hardware connection between a telephone caller and a call center agent;
 then, receiving at a call center a triggering signal indicating that Personally Identifiable Information (PII) data is about to be sent from the telephone caller and wherein the triggering signal does not signal that a physical interruption of the hardware connection should be implemented;
 receiving at a call center an input communication originating from the telephone caller and comprising PII data;
 in response to the triggering signal, detecting the PII data in the received input communication by analyzing the received input communication;
 suppressing at least a portion of the received PII data in response to the detecting the PII data in the received input communication without altering the hardware connection between the telephone caller and the call center agent.

2. The method of claim 1 and further comprising:
 maintaining a voice connection between the telephone caller and the call center agent while the PII data is suppressed.

3. The method of claim 1 and further comprising:
 conveying a remainder of the input communication to the call center agent or to a computer of the call center agent.

4. The method of claim 1 and further comprising:
 determining that the input communication includes PII data before the suppressing of the PII data.

5. The method of claim 4 wherein the determining that the input communication includes PII data comprises:
 receiving an input signal that a payment web page has been served to the computer of a call center agent.

6. The method of claim 4 wherein the determining that the input communication includes PII data comprises:
 receiving an input signal that the call center agent has activated a payment interface.

7. The method of claim 4 wherein the determining that the input communication includes PII data comprises:
 determining that the call center agent is using a cursor in a payment graphical user interface.

8. The method of claim 1 and further comprising:
preventing physical storage of transient PII data before handing off the PII data to an adjunct process.

9. The method of claim 1 wherein suppressing the PII data from the input communication comprises:
suppressing at least a portion of the received PII data without pausing call monitoring of the input communication.

10. The method of claim 1 wherein suppressing the PII data comprises:
removing the PII data from the communication.

11. The method of claim 1 wherein suppressing the PII data comprises:
replacing the PII data with proxy tone data.

12. The method of claim 1 wherein suppressing the PII data comprises:
intercepting and manipulating Voice Over IP (VOIP) packets containing PII data.

13. The method of claim 1 and further comprising:
providing a visual proxy for a PII data number on a computer of the call center agent to indicate an entry of the PII data number by the telephone caller.

14. The method of claim 1 and further comprising:
muting a connection between the telephone caller and the call center agent for a portion of the time that PII data is entered by the telephone caller;
unmuting the connection between the telephone caller and the call center agent for a remaining portion of the time that the PII data is entered by the telephone caller.

15. The method of claim 1 wherein the suppressing of the PII data is implemented without having to hardware-terminate and regenerate the input communication in order to suppress the PII data.

16. An apparatus comprising:
a computer processing unit (CPU),
wherein the CPU is configured to respond to a triggering signal received at a call center indicating that Personally Identifiable Information (PII) data is about to be sent from a telephone caller and wherein the triggering signal does not signal that a physical interruption of a hardware connection between the telephone caller and the call center should be implemented; and
wherein the CPU is coupled with a call center device positioned to receive an input communication containing the PII data and originating from a telephone caller;
wherein the CPU is configured to detect the PII data in the received input communication by analyzing the received input communication;
wherein the CPU is configured to suppress at least a portion of the PII data in response to the detecting of the PII data in the received input communication.

17. The apparatus of claim 16 wherein the CPU is configured to implement code to cause a voice connection between the telephone caller and the call center agent to be maintained while the PII data is suppressed.

18. The apparatus of claim 16 wherein the CPU is configured to implement code to cause the call center device to convey a remainder of the input communication to the call center agent or to the computer of the call center agent.

19. The apparatus of claim 16 wherein the CPU implements code to cause a determination that the input communication includes Personally Identifiable Information (PII) data before the suppressing of the PII data.

20. A method comprising:
receiving at a Personally Identifiable Information Data Suppression server disposed within a physically secure facility in compliance with the Payment Card Industry-Data Security Standard (PCI-DSS) a triggering signal indicating that Personally Identifiable Information (PII) data is about to be sent from a telephone caller and wherein the triggering signal does not signal that a physical interruption of a hardware connection between the telephone caller and a call center should be implemented;
receiving at the call center an input communication originating from the telephone caller and comprising PII data;
in response to the triggering signal, detecting the PII data in the received input communication by analyzing the received input communication;
suppressing at least a portion of the received PII data without requiring a physical interrupt of the input communication;
conveying the PII data to the Personally Identifiable Information Data Suppression server;
conveying the PII data from the Personally Identifiable Information Data Suppression server to a payment gateway.

* * * * *